United States Patent [19]

Florent et al.

[11] Patent Number: 5,423,507
[45] Date of Patent: Jun. 13, 1995

[54] BRACKET FOR HOLDING CEILING SUSPENDED FIXTURES

[76] Inventors: Bertrand Florent, 105, de Montbrun, Boucherville, Quebec, Canada, J4B 4V1; Roger Proulx, 383, Laurier, Otterburn Park, Quebec, Canada, J3H 1E4

[21] Appl. No.: 296,475

[22] Filed: Aug. 26, 1994

Related U.S. Application Data

[63] Continuation of Ser. No. 34,429, Mar. 19, 1993, abandoned.

[51] Int. Cl.[6] ............................................. F16M 13/00
[52] U.S. Cl. ................................... 248/300; 248/317; 248/339; 52/39; 52/712
[58] Field of Search ...................... 248/300, 225.2, 339, 248/340, 317, 228, 72; 52/39, 27, 698, 712, 715

[56] References Cited

U.S. PATENT DOCUMENTS

| | | | |
|---|---|---|---|
| 1,569,060 | 1/1926 | Wright | 248/228 |
| 2,509,895 | 5/1950 | Wakefield | 248/343 |
| 2,802,634 | 8/1957 | Everett | 248/300 |
| 2,919,879 | 1/1960 | Hume | 248/906 X |
| 3,022,033 | 2/1962 | Flower | 248/300 |
| 3,104,737 | 9/1963 | Fork | 52/39 X |
| 3,208,708 | 9/1965 | Brannies | 248/317 X |
| 3,275,817 | 9/1966 | Schwartz et al. | 248/343 X |
| 3,918,234 | 11/1975 | Weissman | 248/300 X |
| 4,025,019 | 5/1977 | Jacobsen et al. | 248/317 |
| 4,065,090 | 12/1977 | Mauney | 248/317 X |
| 4,787,587 | 11/1988 | Deming | 248/205.1 |
| 4,978,092 | 12/1990 | Nattel | 248/205.1 |

*Primary Examiner*—Karen J. Chotkowski

[57] ABSTRACT

A ceiling mounted bracket is adapted to be fixed under a corrugated ceiling formed of U-shaped channels having flaring sides. The bracket which has a U-shaped cross-section corresponding to one channel is formed of two lateral faces and a joining face provided with a perforation suitable for hanging a ceiling fixture.

5 Claims, 2 Drawing Sheets

BRACKET FOR HOLDING CEILING SUSPENDED FIXTURES

This is a continuation of application Ser. No. 08/034,429, filed Mar. 19, 1993, and now abandoned.

BACKGROUND OF THE INVENTION

1. Field of the Invention

The invention is directed to a mounting bracket adapted to be mounted on a corrugated ceiling so as to support a light, a fan or similar ceiling fixtures. The mounting bracket has a generally U-shaped cross-section with legs flaring outwardly so as to generally correspond to the shape of a corrugation in the ceiling. The bracket is particularly provided with an opening for hooking the ceiling fixture.

2. Prior Art

U.S. Pat. No. 3,022,033 issued on Feb. 20, 1962 describes a service bracket having a generally U-shape cross-section extending on both sides with flanges. The flanges are adapted to abut against a wall and be retained thereto by a screw extending through the flat apex face of the U-shaped cross-section. An opening extending completely through both sides of the U-shaped cross-section allows the extension of an attaching bail of a service line.

U.S. Pat. No. 4,978,092 is directed to a universal support bracket for attachment to the back of an electrical box. The bracket is particularly characterized by flanges which are adapted to be bent to take into consideration the thickness of an electrical box or the depth of a wall structure.

Another universal bracket is disclosed in U.S. Pat. No. 4,787,587 which includes at least one opening for receiving a fastener on a flat portion thereof. A second flat portion is provided with a notch and a third flat portion forms an obtuse angle with the second flat portion. Such a bracket would not be suitable for supporting a light fixture on a corrugated surface.

SUMMARY OF THE INVENTION

The mounting bracket according to the invention is adapted to be mounted on a ceiling formed of adjacent U-shaped channels having flaring sides. The bracket has a generally U-shaped cross-section formed by two lateral flat faces and a joining flat face between the lateral faces. The lateral faces are flaring outwardly to angularly correspond to the flaring sides of the channels and to abut thereagainst. The lateral sides of the bracket are provided with holes to receive fastening means for securing the bracket to the channels. The joining face between the two lateral faces is provided with a perforation to allow a ceiling fixture to be hooked therefrom.

In one embodiment, the joining face has a rectangular portion deformed downwardly for forming a V-shaped hook extending crosswise relative to the U-shaped cross-section of the bracket.

In another embodiment, the joining face and one of the lateral faces have a perforated slot extending towards each other to define a common opening through both the lateral face and the joining face. A transverse slot across the perforated slot in the lateral face and at a level above the joining face defines a shoulder on each side of the opening. This opening is adapted to allow the sideways passage of a fastening device and of a washer through the transversal slot for allowing the washer to sit behind the shoulder and be retained thereby.

DETAILED DESCRIPTION OF THE INVENTION

Figures 1, 2:
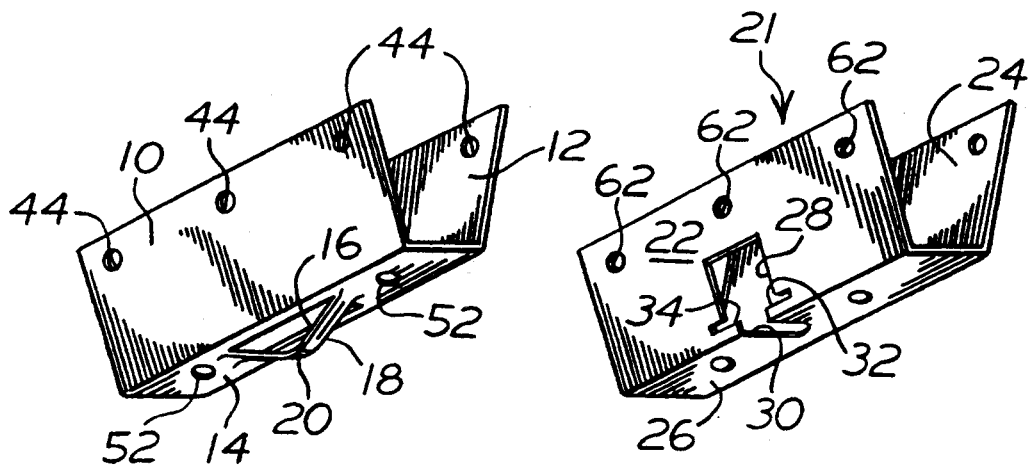
FIG. 1 is a perspective view of one embodiment of the bracket according to the invention.
FIG. 2 is a perspective view of another embodiment of the bracket.

FIG. 1 illustrates a bracket according to the invention having a U-shaped cross-section formed by a pair of lateral faces 10 and 12 and a joining face 14. The lateral faces 10 and 12 are flaring outwardly from the joining face 14 at a predetermined angle to be explained later. The joining face 14 is provided with a perforation obtained by sufficiently deforming the material of the joining face 14 to produce a transversal perforation 16. For this purpose, the joining face 14 is punched downwardly with a triangular punch which is applied over a rectangular surface in joining face 14, the apex of the triangular punch being adapted to break the material of the joining face 14 and produce a generally triangular perforation 16. The apex 20 of the strip 18 will serve to support a suitable hook passing through the perforation 16 as explained later.

The embodiment shown in FIG. 2, is similarly characterized by two lateral faces 22 and 24 flaring outwardly from a joining face 26 to generally form a U-shaped cross-section. The lateral face 22 is provided with a downward slot 28 continuously extending through a slot 30 in the joining face 26. A transversal slot 22 is preferably provided through the lateral face 22 at a level adjacent and above the joining face 26 to form a shoulder 34 for a purpose explained later.

Figure 3:
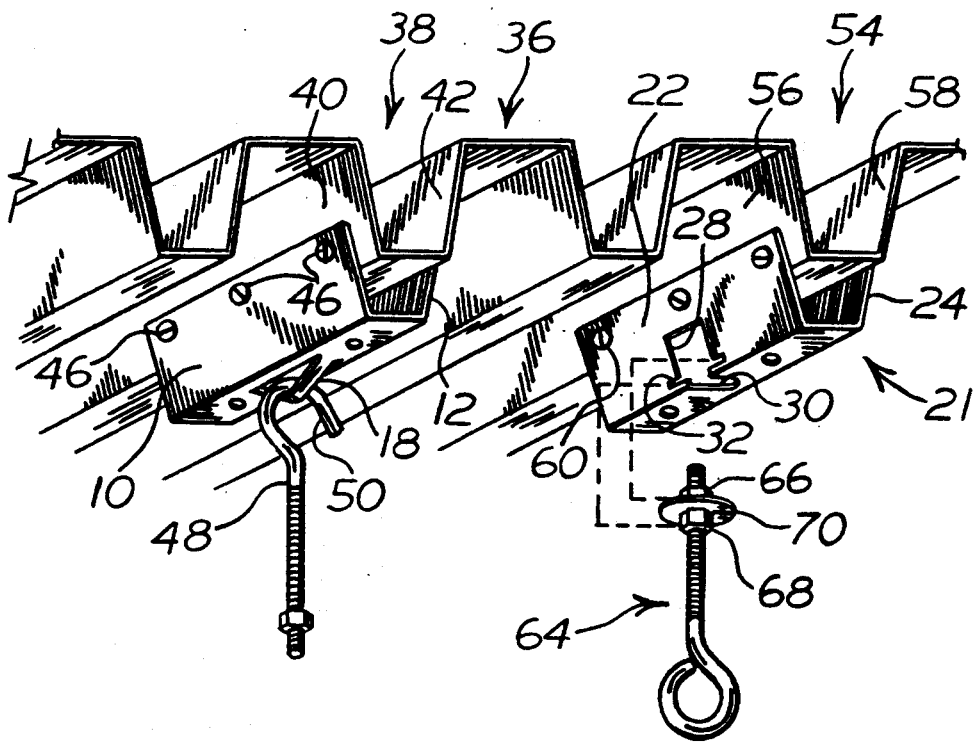
FIG. 3 illustrates the brackets shown in FIGS. 1 and 2 secured to a corrugated ceiling.

The brackets illustrated in FIGS. 1 and 2 are shown in FIG. 3 fixed under a corrugated ceiling 36. The corrugated ceiling 36 is formed of adjacent U-shaped channels having flaring sides oriented at an angle substantially corresponding to the angle of the flaring lateral faces of the brackets illustrated in FIGS. 1 and 2.

The bracket illustrated in FIG. 1 is mounted in a straddling arrangement over channel 38 formed by two flaring sides 40 and 42 at an angle substantially corresponding to the angle of the flaring faces 10 and 12. The lateral faces 10 and 12 are provided with a set of holes 44 adapted to receive screws 46 for securing the lateral faces 10 and 12 on the sides 40 and 42 of the channel 38. When the bracket is fixed to the channel 38, a hook 48 having an open loop 50 can be supported by the strip 18 about its apex 20. The hook 48 is adapted to support a ceiling fixture (not shown). The bracket may also be provided with a pair of openings 52 in the joining face 14. The openings 52 are adapted to allow the passage of electrical wires when the ceiling fixture is an electrical fixture.

The bracket 21 shown in FIG. 2, is similarly adapted to be mounted on a channel 54 of the corrugated ceiling.

By straddling the lateral face 22 and 24 over the sides 56 and 58 of the channel 54 by a set of screws 60 extending through a set of holes 62 provided In the lateral faces 22 and 24 of the bracket 21. The slots 28 and 30 are adapted to allow the passage of a hook 64 provided with a pair of nuts 66 and 68 and a washer 70. The washer 70 is dimensioned to slide through the slot 32 and be retained inside the bracket 21 by the shoulder 34 to prevent it from sliding out. The two nuts 66 and 68 are adapted to be tightened against the joining face 26 for maintaining the hook 64 secured along the slot 30. It should be understood that the shoulders 34 and the washer 70 are not compulsory elements when the nuts 66 and 68 are sufficiently large and tightly secured to the bracket 21 for the purpose intended.

Figure 4:
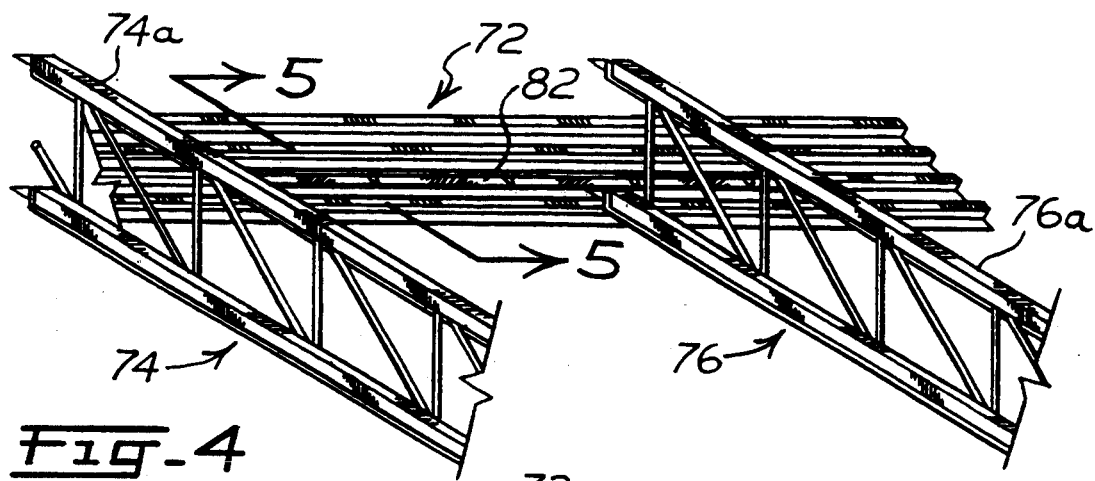
FIG. 4 illustrates a perspective bottom view of a corrugated ceiling supported by a frame structure.
Figure 5:
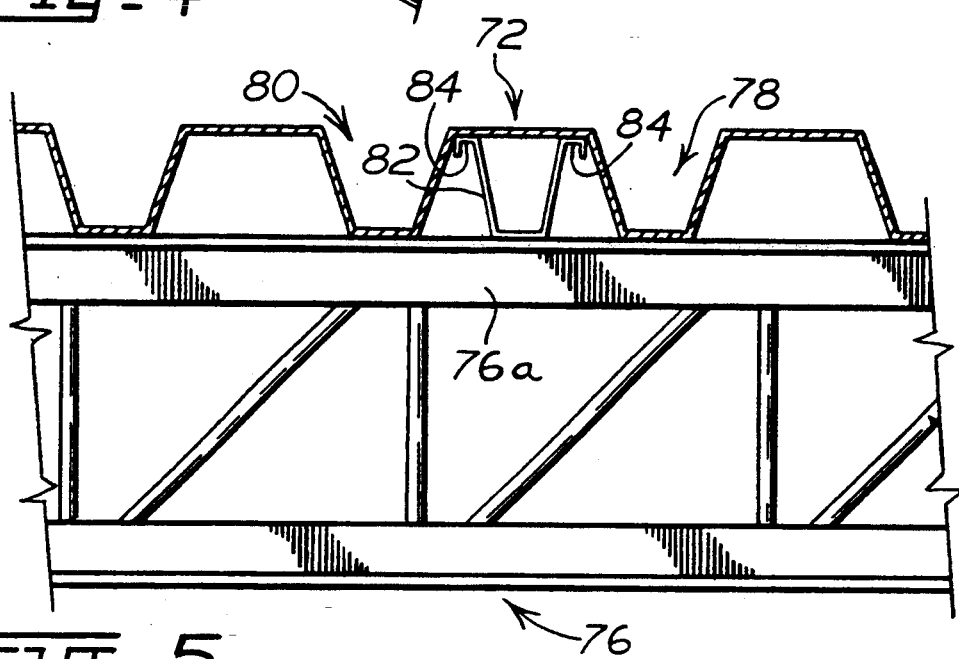
FIG. 5 is a cross-sectional view along line 5—5 shown in FIG. 4, and FIGS. 6 and 7 illustrate two different embodiments of brackets according to the invention adapted to be supported by the frame shown in FIGS. 4 and 5.

The brackets described in FIGS. 1 and 2 may have a length of about 3 to 6 inches and are adapted to support one ceiling fixture. The same bracket may be mounted differently below the corrugated ceiling because such ceilings are generally supported by structural frames of the type shown in FIGS. 4 and 5. The corrugated ceiling 72 is mounted over a structural frame made of truss beams 74 and 76 disposed transversely relative to the channels 78 and 80 of the corrugated ceiling 72. With this arrangement as shown In FIGS. 4 and 5, the bracket 82 according to the invention has a length which exceeds the distance between the two beams 74 and 76 on which it is supported. The bracket 82 has a length which usually exceeds 6 feet and is mounted between two adjacent channels 78 and 80 and rests on the upper beams 74a and 76a of the truss beams 74 and 76. The width of the bracket 82 is dimensioned so as to sidewardly abut against the two adjacent channels 78 and 80. Such a dimension allows the bracket 82 to be installed by sliding it over the frame 74 and 76 between two adjacent channels such as 78 and 80.

Figure 6:
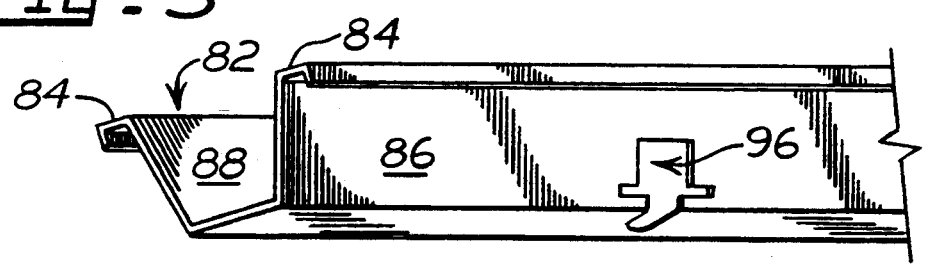

Considering that brackets such as 82 are relatively long, they are rigidified with lateral flanges 84 to prevent their bending between the two adjacent truss beams 74 and 76. The embodiment of the brackets 82, shown in FIG. 6, is provided with flanges 84 extending outwardly relative to the free edges of the lateral faces 86 and 88. Another embodiment for the flanges consists of inwardly projecting flanges 90 relative to the lateral faces 92 and 94.

Figure 7:
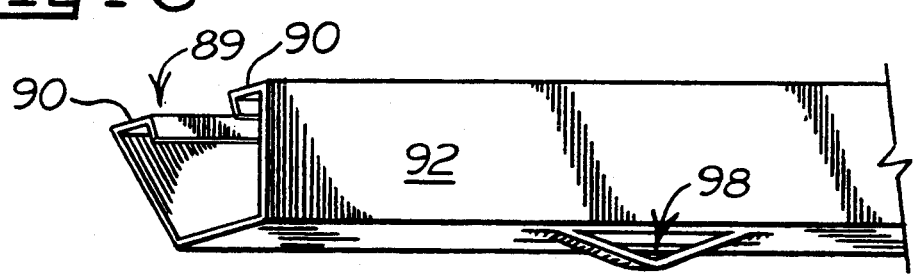

The bracket 82 shown in FIG. 6 is provided with perforations 96 of the type shown in FIG. 2 while the bracket 89 shown in FIG. 7 is provided with a perforation 98 of the type shown in FIG. 1. It should be obvious that the same bracket may be provided with both types of perforations 96 and 98 along their length.

We claim:

1. A mounting bracket to be fixed under a ceiling made of sheet material and formed with adjacent U-shaped channels each having two outwardly flaring flat side walls and a bottom flat wall interconnecting said two flat side walls, wherein:
    said bracket is made of sheet material;
    said bracket has a generally U-shaped cross-section formed by two lateral flat members and a joining flat member interconnecting said two lateral flat members;
    said two lateral flat members flare outwardly to angularly correspond to said two flat side walls to be applied to said two flat side walls, respectively;
    said bottom flat wall has a first width and said joining flat member has a second width narrower than said first width whereby said joining flat member is spaced apart from said bottom flat wall when said two lateral flat members are applied to said two flat side walls, respectively;
    said two lateral flat members are provided with means for securing said two lateral flat members to the two flat side walls of one of the channels, respectively; and
    at least one of said joining flat member and lateral flat members comprises means for attaching to said bracket a ceiling-supported fixture.

2. A mounting bracket as recited in claim 1, in which said attaching means comprises said joining flat member formed with two substantially parallel cuts to enable deformation of a rectangular portion of said joining flat member into a downward generally V-shaped hook integral with said joining flat member.

3. A mounting bracket as recited in claim 2, wherein said joining flat member is elongate and wherein said cuts and downward hook are longitudinal.

4. A mounting bracket as recited in claim 1, wherein said attaching means comprises said joining flat member and one of said two lateral flat members formed with a slot perforated through both said joining flat member and said one lateral flat member, and said one lateral flat member formed with a widened extension of said slot for enabling insertion of a fastener device to be mounted in said slot, said fastener device extending in the space between said joining flat member and said bottom flat wall.

5. A mounting bracket as recited in claim 4, wherein said widened extension of the slot is remote from said joining flat member whereby said one lateral flat member defines a shoulder on each side of the slot.

* * * * *